No. 884,308. PATENTED APR. 7, 1908.
N. M. ANDERSON.
CORN GATHERING AND HUSKING MACHINE.
APPLICATION FILED NOV. 1, 1906.
3 SHEETS—SHEET 3.
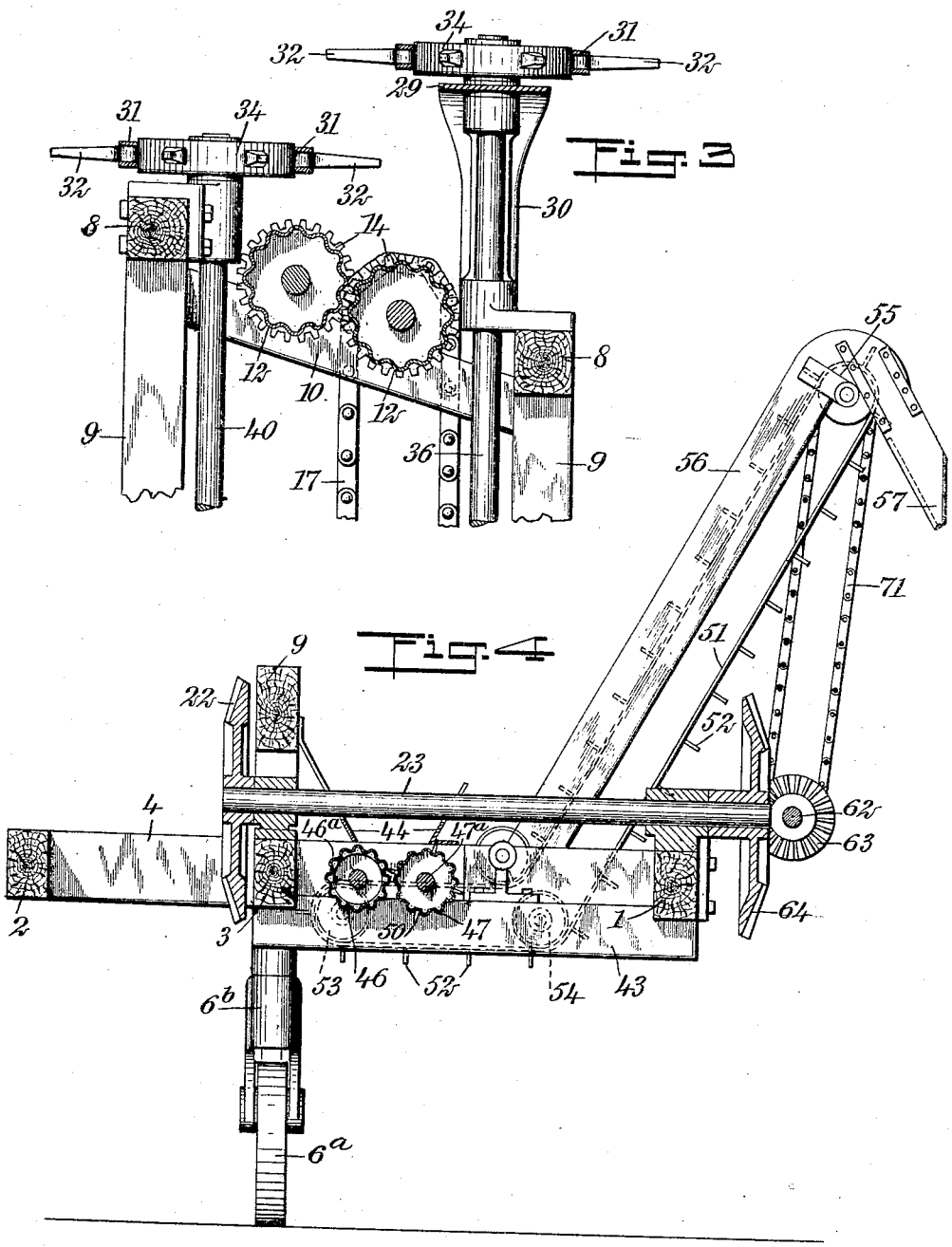

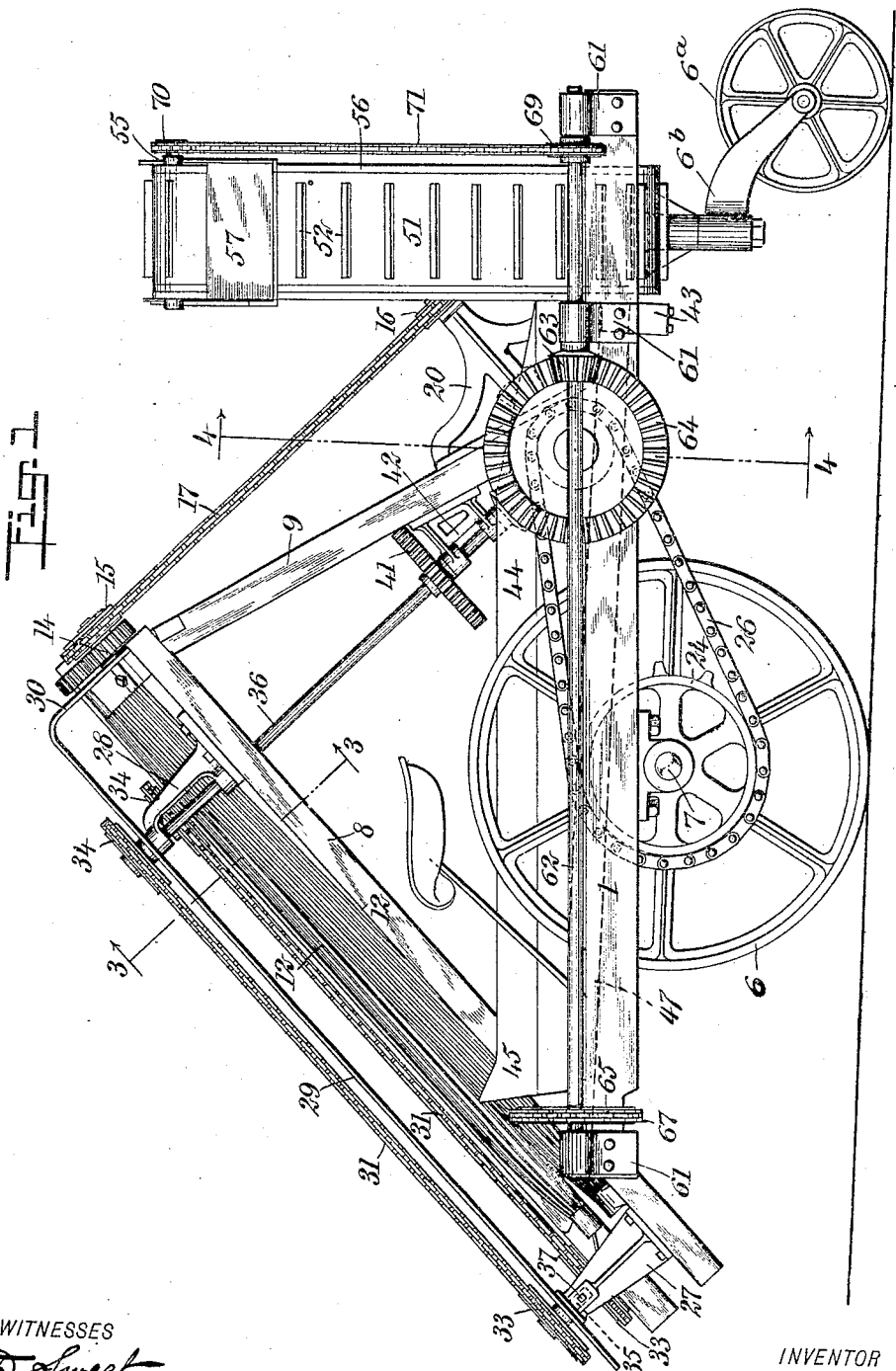

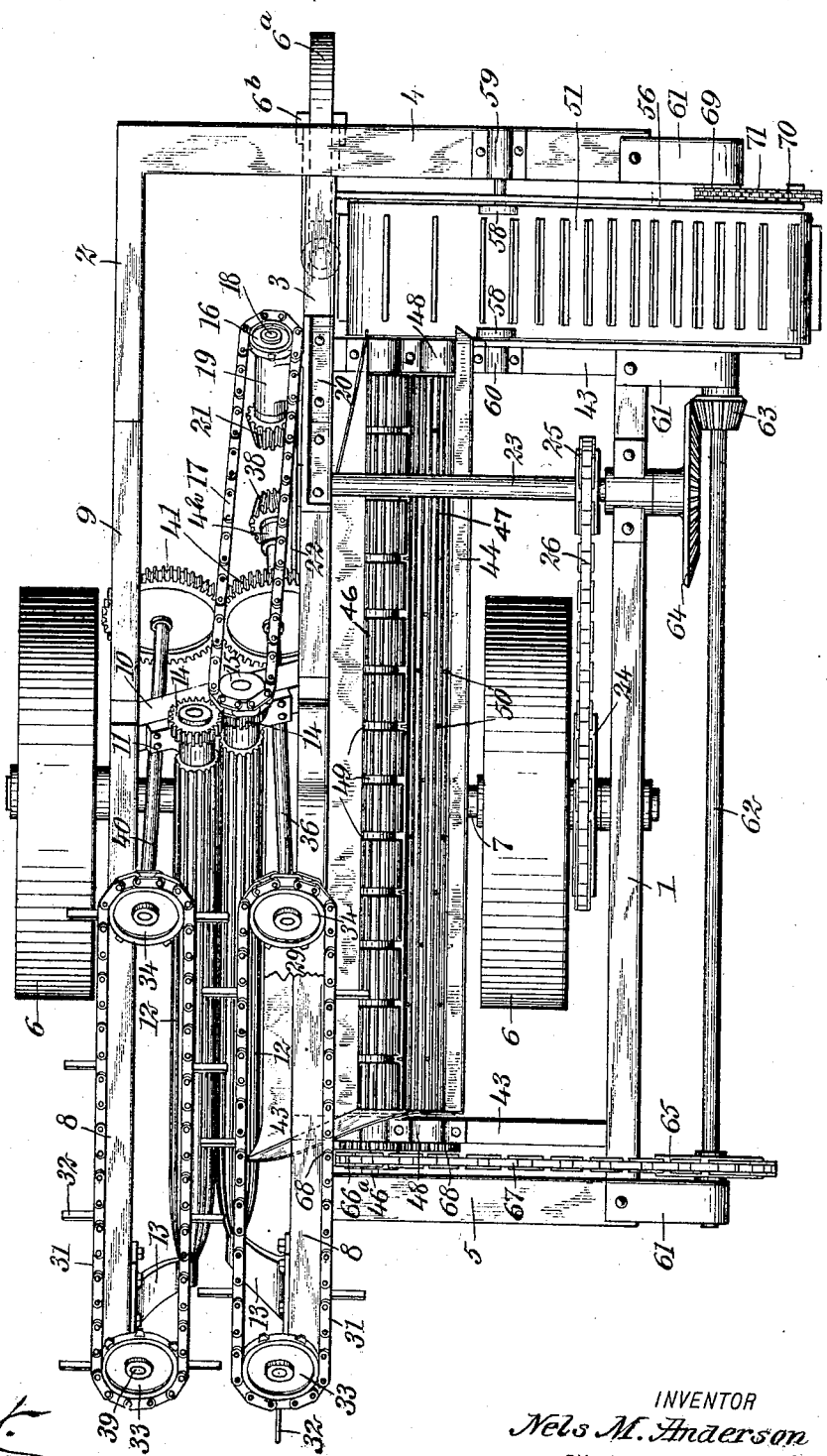

UNITED STATES PATENT OFFICE.

NELS MARTIN ANDERSON, OF GALVA, ILLINOIS, ASSIGNOR OF ONE-THIRD TO SANDER M. HOKOM AND ONE-THIRD TO PETER A. NORBORG, OF GALVA, ILLINOIS.

CORN GATHERING AND HUSKING MACHINE.

No. 884,308.      Specification of Letters Patent.      Patented April 7, 1908.

Application filed November 1, 1906. Serial No. 341,548.

*To all whom it may concern:*

Be it known that I, NELS MARTIN ANDERSON, a citizen of the United States, and a resident of Galva, in the county of Henry and State of Illinois, have invented a new and Improved Corn Gathering and Husking Machine, of which the following is a full, clear, and exact description.

This invention is an improvement in machines for gathering and husking corn in the field and discharging the same into a wagon or other convenient means for receiving it, all of the operations being performed automatically as the machine is drawn over the field.

One embodiment of the invention, generally stated, consists of a frame-work supporting at one side thereof in an inclined position, two corrugated or fluted rolls arranged on a skew for receiving the stalks of corn therebetween as the machine moves forward, and removing the ears. The ears, on being removed, drop into a trough having two rearwardly-inclined rolls arranged at the bottom thereof, acting to remove the husk from the ear and discharging the corn upon a conveyer, the latter elevating it to a chute where it is discharged into any convenient means for receiving it, preferably a wagon for hauling it to a place of storage.

Reference is to be had to the accompanying drawings forming a part of this specification, in which similar characters of reference indicate corresponding parts in all the figures.

Figure 1 is a side elevation of the machine as it is preferably constructed; Fig. 2 is a plan of the same; Fig. 3 is a section on the line 3—3 of Fig. 1, and Fig. 4 is a section on the line 4—4 of Fig. 1, both of said sections being viewed in the direction of their respective arrows.

The machine embodies in its construction a rectangular frame composed of side sills 1 and 2 and an intermediate sill 3, all of which are connected together at the rear of the machine by an end sill 4, and the sills 1 and 3 connected together at the forward end of the machine by an end sill 5. This part of the frame of the machine is supported at substantially its center on wheels 6 fixed to an axle 7 journaled in bearings carried on the face of the sills 1 and 2, said frame being further supported at its rear end by a wheel $6^a$ journaled between a fork $6^b$, the latter being pivotally connected to the intermediate sill 3.

At one side and at the forward end of the machine are supported on the frame-work just described, two forwardly-inclined beams 8 arranged at an angle of substantially 45 degrees to the plane of the sills 1 and 3 and at different elevations, the rear ends of said beams being bolstered up by inclined struts 9 secured to the rectangular frame and connected together at their upper ends by a crossbar 10. Carried on the crossbar 10 are bearing-boxes 11 in which are journaled two coacting, corrugated tubular rolls 12 arranged substantially parallel to the beams 8, and having their lower ends journaled in brackets 13 depending from said beams. The rolls 12 are skewed or have their axes at a slight angle to each other, with their forward and lower ends tapered to readily admit a stalk of corn therebetween. The inner roll 12 is slightly depressed below the outer roll, acting when in operation, to throw the ears of corn to the inside of the machine. For operating both rolls, causing them to revolve toward each other they are provided at their upper ends with intermeshing gears 14, a sprocket-wheel 15 being fixed to the inner roll, which is connected and driven from a sprocket-wheel 16 by a chain 17. The sprocket-wheel 16 is fixed to the extremity of a shaft 18 journaled in a bearing 19 carried at one side of a bracket 20, the latter being bolted or otherwise secured in the angle between the inner strut 9 and the intermediate sill 3. The shaft 18 is substantially parallel to the rolls 12 and has fixed to its lower end a small bevel gear 21 meshing with a somewhat larger gear 22 carried at one end of a cross-shaft 23. This cross-shaft is journaled in suitable bearings carried by the sills 1 and 3, and is driven from the axle of the machine by a suitable gearing, preferably consisting of a large sprocket-wheel 24 fixed to the axle and connected with a somewhat smaller sprocket-wheel 25, by a chain 26.

Supported on the inner beam 8 on standards 27 and 28 arranged near its forward and rearward ends, respectively, is a wide, sheet metal plate 29 slightly overhanging the inner roll 12 at one side, and further secured to the beam 8 at its upper end by a foot 30. The outer edge of this plate engages the corn stalks as they are received between the rolls 12 and prevents said stalks from falling over to the inside of the machine For positively feeding and drawing the corn-stalks between the rolls 12 are provided chains 31, having projecting fingers 32 at intervals thereon arranged above and at each side of a plane passing between the rolls, the chains being carried on sprocket-wheels 33 and 34 positioned, respectively, near the lower and upper ends of the beam 8. The sprocket-wheels 33 and 34 carried by the inner beam 8 are fixed to shafts 35 and 36 journaled, respectively, in the standards 27 and 28, the shaft 35 being in the nature of a short stud held from longitudinal movement by a set-screw 37 passing into a circumferential groove therein, and the shaft 36 being extended to the large bevel gear 22 where it is provided with a small bevel gear 38 meshing therewith. The sprocket-wheels 33 and 34 carried by the outer beam 8 are fixed to shafts 39 and 40, respectively, bringing the chain at this side of the machine somewhat closer to the rolls 12 than the opposite chain, and by means of the fingers 32 extending therefrom not only acting to draw the corn-stalks between the rolls, but preventing the ears, after removal of the stalk, from sliding from the rolls to the ground. The shaft 40, as best shown in Figs. 2 and 3, is extended parallel to the shaft 36 and intergeared therewith by gears 41, one gear being fixed to each shaft adjacent to a bracket 42 carried by each of the struts 9, in which the shafts are journaled.

Fixed to the sills 1 and 3 are crossbars 43 supporting adjacent to the sill 3, a sheet metal trough 44, the forward end of said trough having an upwardly-extending lip 45 to receive the ears of corn from the inner roll 12. The bottom of the trough is formed by coacting rolls 46 and 47 fixed to shafts 46ª and 47ª, respectively journaled in bearings 48 carried by the crossbars 43. The rolls 46 and 47 are preferably formed of sheet metal pipe, corrugated longitudinally, with the roll 46 having a series of annular grooves 49 passing about its circumference, which coöperates with a series of blades 50 arranged in a corresponding manner on the circumference of the roll 47. The rolls 46 and 47 slightly incline rearwardly to an elevator carried at the rear end of the machine and consisting of an endless apron 51 having projecting strips 52 arranged at intervals on the face thereof and passing about rollers 53, 54 and 55, best shown in Fig. 4. The rollers 53 and 54 are journaled in the end sill 4 and adjacent crossbar 43, whereas the roller 55 is journaled at the upper end of a trough 56 receiving the upper face of the apron, said trough terminating in an inclined chute 57 overhanging one side of the machine. As shown in Fig. 4, the horizontal portion of the apron 51 is positioned below the rear end of the rolls 46 and 47, and is made to conform to the angle of the trough 56 by means of idle rollers 58 carried on shafts which are journaled in bearings 59 and 60 carried respectively by the end sill 4 and adjacent cross-bar 43.

Connected to the side sill 1 and overhanging this side of the machine, are brackets 61, each providing a bearing in which a longitudinal shaft 62 is journaled, said shaft having a small bevel gear 63 fixed thereto, which intermeshes with a somewhat larger bevel gear 64 fixed to the outer end of the cross-shaft 23. Fixed to the forward end of the shaft 62 is a sprocket-wheel 65, which is connected to a sprocket-wheel 66 fixed to the shaft 46ª by a chain 67 acting to drive the roll 46 and by reason of the intermeshing gears 68 carried by the shafts 46ª and 47ª, drives the roll 47.

Adjacent to the rear bracket 61 and fixed to the shaft 62 is a sprocket-wheel 69 connected to a sprocket-wheel 70 by a chain 71, the sprocket-wheel 70, as best shown in Fig. 1, being carried at one end of the roller 55 and acting to drive the roller and apron when the machine is set in motion.

In the operation of the machine as it is pulled forwardly, the corn-stalks are drawn between the rolls 12 by the fingers 32, the former removing the ears of corn which fall upon the extending lip 45 of the trough 44 and onto the rolls 46 and 47. The moving blades 50 of the roll 47 coacting with the annular grooves of the roll 46, remove the husks from the ears; and in view of their inclined relation, the corn is worked by gravity onto the apron 51, said apron carrying the corn to an elevated position at one side of the machine and discharging it through the chute 57 into any convenient means for receiving it.

Although I have described the preferred embodiment of the machine, I consider the precise construction as immaterial and limited only by the scope of the annexed claims.

Having thus described my invention I claim as new and desire to secure by Letters Patent:

1. In a machine of the character described, two coacting, forwardly and downwardly-inclined harvesting rolls positioned side by side and having their longitudinal axes arranged at a slight inclination to each other, whereby the lower end of one of said rolls is depressed below the other for the purpose described.

2. In a machine of the character described, two coacting, forwardly and downwardly-inclined, longitudinal, corrugated, harvesting rolls having their longitudinal axes arranged at a slight inclination to each other, whereby the lower end of one of said rolls is depressed below the other for the purpose described.

3. In a machine of the character described, a frame-work, two coacting, forwardly and downwardly-inclined corn-gathering rolls journaled at one side of the frame-work, the lower end of one of said rolls being depressed below the lower end of the other, and chains having fingers movably mounted over the lower ends of said rolls with the chain over the depressed roll arranged at a higher elevation than the chain over the opposite roll.

4. In a machine of the character described, means for gathering corn from the stalk, comprising two coacting forwardly and downwardly inclined, corrugated, tubular rolls the lower end of one of said rolls being depressed below the lower end of the other, and flexible members having fingers movable over the lower ends of said rolls and arranged at different elevations.

5. In a machine of the character described, a frame-work, two coacting, forwardly and downwardly-inclined harvesting rolls arranged at one side of the frame-work, two coacting, rearwardly and downwardly-inclined husking rolls supported by the frame-work at the side of the harvesting rolls, a cross-shaft journaled in bearings carried by the frame-work, a longitudinal shaft arranged at the opposite side of the machine from the harvesting rolls and driven by the cross-shaft, means for driving the harvesting rolls from the cross-shaft, and means for driving the husking rolls from the longitudinal shaft.

6. In a machine of the character described, a frame-work, an axle having wheels supporting the frame-work near the center thereof, a third wheel supporting the rear end of the frame-work, a cross-shaft journaled in the frame-work, means for driving said cross-shaft from said axle, a longitudinal shaft journaled at one side of the frame-work driven by said cross-shaft, two coacting, forwardly and downwardly-inclined corn-gathering rolls journaled at one side of the frame-work, two coacting, rearwardly and downwardly-inclined husking-rolls journaled on the frame-work at one side of the corn-gathering rolls, an elevator supported on the frame-work at the rear of the machine for receiving the corn from the husking rolls, means for driving the corn-gathering rolls from said cross-shaft, and means for driving the husking rolls and the elevator from said longitudinal shaft.

7. In a machine of the character described, a frame-work, an axle having wheels supporting the frame-work one of said wheels being arranged at the inside and the other of said wheels arranged at the outside of the frame-work, a third wheel supporting the rear end of the frame-work, two coacting, forwardly and downwardly-inclined corn-gathering rolls journaled at one side of the frame-work, two rearwardly and downwardly-inclined corn-husking rolls journaled on the frame-work at one side of and below the corn-gathering rolls, whereby the latter discharges directly thereon, and means for driving said rolls from said axle.

8. In a machine of the character described, a frame-work, an axle having wheels supporting the frame-work one of said wheels being arranged at the inside and the other of said wheels arranged at the outside of the frame-work, a third wheel supporting the rear end of the frame-work, two coacting, forwardly and downwardly-inclined corn-gathering rolls journaled at one side of the frame-work, two rearwardly and downwardly-inclined corn-husking rolls journaled on the frame-work at one side of and below the corn-gathering rolls, whereby the latter discharges directly thereon, an elevator arranged at the rear and at one side of the frame-work for receiving the corn from the husking rolls, and means for driving said rolls and said elevator from said axle.

In testimony whereof I have signed my name to this specification in the presence of two subscribing witnesses.

NELS MARTIN ANDERSON.

Witnesses:
    ERIC LUNDIN,
    A. E. LUNDEEN.